US009509670B2

(12) United States Patent
Balasingh et al.

(10) Patent No.: US 9,509,670 B2
(45) Date of Patent: Nov. 29, 2016

(54) SYSTEM AND METHOD FOR MANAGING SECURE COMMUNICATIONS IN AN AD-HOC NETWORK

(71) Applicant: Google Technology Holdings LLC, Mountain View, CA (US)

(72) Inventors: Binesh Balasingh, Bangalore (IN); Viji Alexander, Bangalore (IN); Gabriel B. Burca, Palatine, IL (US); Ranjeet Gupta, Chicago, IL (US); Eric J. Hefner, Lombard, IL (US); Mary K. Hor-Lao, Vernon Hills, IL (US); Ishwara Ja, Bangalore (IN); Douglas A. Lautner, Round Lake, IL (US); Sudhir C. Vissa, Bensenville, IL (US)

(73) Assignee: Google Technology Holdings LLC, Mountain View, CA (US)

(*) Notice: Subject to any disclaimer, the term of this patent is extended or adjusted under 35 U.S.C. 154(b) by 177 days.

(21) Appl. No.: 14/462,973

(22) Filed: Aug. 19, 2014

(65) Prior Publication Data

US 2016/0057117 A1    Feb. 25, 2016

(51) Int. Cl.
*H04L 29/06* (2006.01)
*H04L 9/30* (2006.01)
(Continued)

(52) U.S. Cl.
CPC .............. *H04L 63/061* (2013.01); *H04L 9/30* (2013.01); *H04L 63/065* (2013.01); *H04L 63/08* (2013.01); *H04W 12/04* (2013.01); *H04W 12/06* (2013.01); *H04W 84/18* (2013.01); *H04L 63/104* (2013.01)

(58) Field of Classification Search
CPC . H04L 67/104; H04L 63/061; H04L 63/065; H04L 63/08; H04L 9/30; H04W 84/18; H04W 12/04; H04W 12/06
USPC ....................................................... 713/171
See application file for complete search history.

(56) References Cited

U.S. PATENT DOCUMENTS 5,835,595 A * 11/1998 Fraser ..................... G06F 21/10
                                                           380/30
7,181,614 B1 * 2/2007 Gehrmann ............ H04L 63/065
                                                          709/249

(Continued)

FOREIGN PATENT DOCUMENTS

WO         01/31836 A2      5/2001

OTHER PUBLICATIONS

Camps-Mur, et al., "Device to device communications with WiFi Direct: overview and experimentation," IEEE Wireless Communications Magazine, Jun. 2013, pp. 96-104.

(Continued)

*Primary Examiner* — Yogesh Paliwal
(74) *Attorney, Agent, or Firm* — Faegre Baker Daniels LLP

(57) ABSTRACT

The present invention provides a system and method for managing secure communications in an ad-hoc network having three or more users including a first user, a second user and a third user. Each user is associated with at least one communication device, and has a set of keys associated with the user for managing secure communications between the at least one communication device of the user and the at least one communication device of another one of the three or more users. Each set of keys includes a private key and a public key, where the public key is shared with the communication device of the other ones of the three or more users with which the user has been authenticated, and the private key is used to decrypt communications encrypted using the corresponding public key from the same set of keys. When the second user of the three or more users has been authenticated by the first user, in addition to receiving the associated public key of the second user, the first user receives a value defining a share authority level, which defines the authority of the first user relative to the second user to provide peer key sharing with the third user.

20 Claims, 7 Drawing Sheets

(51) Int. Cl.
*H04W 12/04* (2009.01)
*H04W 12/06* (2009.01)
*H04W 84/18* (2009.01)

(56) References Cited

U.S. PATENT DOCUMENTS

| | | | |
|---|---|---|---|
| 8,468,349 | B2 | 6/2013 | Kageyama et al. |
| 2003/0028585 | A1* | 2/2003 | Yeager .................. G06F 9/4416 709/201 |
| 2006/0046692 | A1* | 3/2006 | Jelinek ................ H04L 63/0492 455/411 |
| 2014/0082205 | A1 | 3/2014 | Abraham et al. |

OTHER PUBLICATIONS

S. Capkun, et al., "Self-Organized Public-Key Management for Mobile Ad Hoc Networks," IEEE Transactions on Mobile Computing, Jan.-Mar. 2003, p. 52-64.

L. Cutillo, et al., "Safebook: A Privacy-Preserving On-Line Social Network Leveraging on Real-Life Trust," IEEE Communications Magazine, Dec. 2009, pp. 94-101.

Multiple Devices—Tox Wiki, https://wiki.tox.im/Multiple_Devices, downloaded from internet: Aug. 19, 2014, all pages.

Cisco: "The Future of Hotspots: Making Wi-Fi as Secure and Easy to Use as Cellular", White Paper, http://www.cisco.com/c/en/us/solutions/collateral/service-provider/service-provider-wi-fi/white_paper_c11-649337.html, 2011, Cisco an/or its affiliates, C11-649337-01, Jun. 2011, all pages.

European Patent Office, International Search Report and Written Opinion for PCT Application No. PCT/US2015/045695 (related to above-captioned patent application), mailed Nov. 20, 2015.

Lei et al., "A Distributed Trust Model for e-Commerce Applications," IEEE, E-Technology, E-Commerce and E-Service, Mar. 29, 2005.

Capkun et al., "Self-Organized Public-Key Management for Mobile Ad Hoc Networks," IEEE, Transactions on Mobile computing, Jan. 1, 2003.

\* cited by examiner

SYSTEM AND METHOD FOR MANAGING SECURE COMMUNICATIONS IN AN AD-HOC NETWORK

FIELD OF THE INVENTION

The present invention relates generally to a system and method for managing secure communications in an ad-hoc network, and more particularly, to peer key sharing of third party public keys not involved in the current communication transfer.

BACKGROUND OF THE INVENTION

Many conventional forms of communication networks are built on the availability of centrally managed infrastructure including access points, routers and servers, where the individual participants communicate with the network and other individual users through the network. In such an instance, security relative to any particular user and their corresponding communications is managed by the network, where the users do not generally communicate directly with each other. In such an instance, each user communicates with the network, and the network manages the routing of the communication to its proper destination.

However such a communication environment requires the establishment and maintenance of the network infrastructure, which is often geographically fixed, in the areas where communications are desired, and which further require support for a communication capacity that is desired by the users. In some instances, access to the network may come with a financial cost to the user, whether there is a cost for accessing the network and/or a cost associated with the amount of information being communicated. Because an established infrastructure that is available to a particular user is not always present, or because it can be more economically beneficial to do so, users may sometimes wish to establish an ad-hoc network, where the users communicate more directly with their intended targets on a peer-to-peer basis without the control or intervention of a centralized agent. However in such instances, alternative provisions may need to be made for security that had previously been handled by a pre-established network infrastructure.

An ad-hoc network is defined as a decentralized type of network that does not rely upon pre-existing infrastructure. Networking functions previously provided by a pre-existing fixed network infrastructure would now need to be handled by the network participants, sometimes referred to as nodes or peer devices. While in some instances, each node can sometimes have relatively equal status, in other instances one or more particular nodes can assume a greater level of control or management. For example, in WI-FI Direct, a group owner can be established. In such an instance, the group owner may function similar to an access point, and thereby enable operability with other WI-FI devices that may not otherwise support WI-FI Direct. As a further example, Bluetooth® allows for the establishment of a piconet, where in general, the entity establishing the piconet often becomes the master that can talk to one or more associated slave devices in point-to-point or point-to-multipoint fashion.

Ad-hoc networks, and more specifically, wireless ad-hoc networks can be either open or secure. Open networks, generally, allow for unrestricted access which can compromise privacy. Secure connections will often require users to undergo some form of provisioning or pairing, which can include a device accepting a requested connection, so as to acknowledge that the user knows the other party. Once acknowledged, devices can often connect or reconnect to each other without a subsequent prompt or notification on either device. In some instances, the same set of credentials may need to be used across all groups or other peer devices, which may be governed by the amount of L2 passwords that can be created. As such, separation of peers may not be feasible. Furthermore, these passwords can be tied to a particular device, and hence not portable across multiple devices owned by the same person. As such, a particular owner may need to separately authenticate each of their devices relative to each of the ad-hoc networks in which the owner may want to participate.

Furthermore, where previously there may have been a single communication connection to manage, between a particular user and the network infrastructure, in an ad-hoc or peer-to-peer environment, a particular user may now need to manage multiple connections with multiple different other users.

Correspondingly, the present inventors have recognized that it would be beneficial to manage the trust defined between different users to extend the relationship to other users without necessarily requiring the user to manage each potential relationship individually. In turn, the applicant has recognized that it may be further beneficial to provide a value defining a share authority level, that can be used to provide peer key sharing in qualifying circumstances.

SUMMARY OF THE INVENTION

The present invention provides a system for managing secure communications in an ad-hoc network. The system includes three or more users including a first user, a second user and a third user, each user being associated with at least one communication device, and having a set of keys associated with the user for managing secure communications between the at least one communication device of the user and the at least one communication device of another one of the three or more users. Each set of keys includes a private key and a public key, where the public key is shared with the communication device of the other ones of the three or more users with which the user has been authenticated, and the private key is used to decrypt communications encrypted using the corresponding public key from the same set of keys. When the second user of the three or more users has been authenticated by the first user, in addition to receiving the associated public key of the second user, the first user receives a value defining a share authority level, which defines the authority of the first user relative to the second user to provide peer key sharing with the third user.

In at least one embodiment, peer key sharing of the public key of the second user by the first user with the third user includes a consideration of the value defining the share authority level relative to the second user, and a level of trust between the first user and the third user.

The present invention further provides a method for managing secure communications in an ad-hoc network. The method includes identifying a plurality of users to be included as part of an ad-hoc network, each user being associated with at least one communication device, and having a set of keys associated with the user for managing secure communications between the at least one communication device of the user and the at least one communication device of another one of the plurality of users. The identified plurality of users are then authenticated including exchanging public keys and verifying the identity of the plurality of users, where authenticating further includes exchanging a value defining a share authority level. A determination is then made as to whether a level of trust associated with the exchanged share level authority enables a first user to provide peer key sharing of a public key of a second user with a third user, and if so, sharing by the first user the public key of the second user with the third user.

The present invention still further provides a communication device for use in an ad-hoc network providing secure communications. The device includes a communication unit including a receiver, and a transmitter. The device further includes a storage unit for storing one or more sets of keys including a public and private key of the user of the device, public keys for each of the other users forming the ad-hoc network, and a share authority level for one or more of the other users forming the ad-hoc network, which defines the authority of the user of the communication device relative to the respective one or more other users for providing peer key sharing with another user. Still further, the device includes a controller adapted for identifying a plurality of users to be included as part of the ad-hoc network, authenticating the identified plurality of users including exchanging public keys and verifying the identity of the plurality of users, and determining whether a level of trust associated with a received share level authority enables the user of the communication device to provide peer key sharing of a public key relative to the respective one or more other users for providing peer key sharing with another user, and if so, sharing by the user the public key of the one or more other users with another user.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

Figure 1:
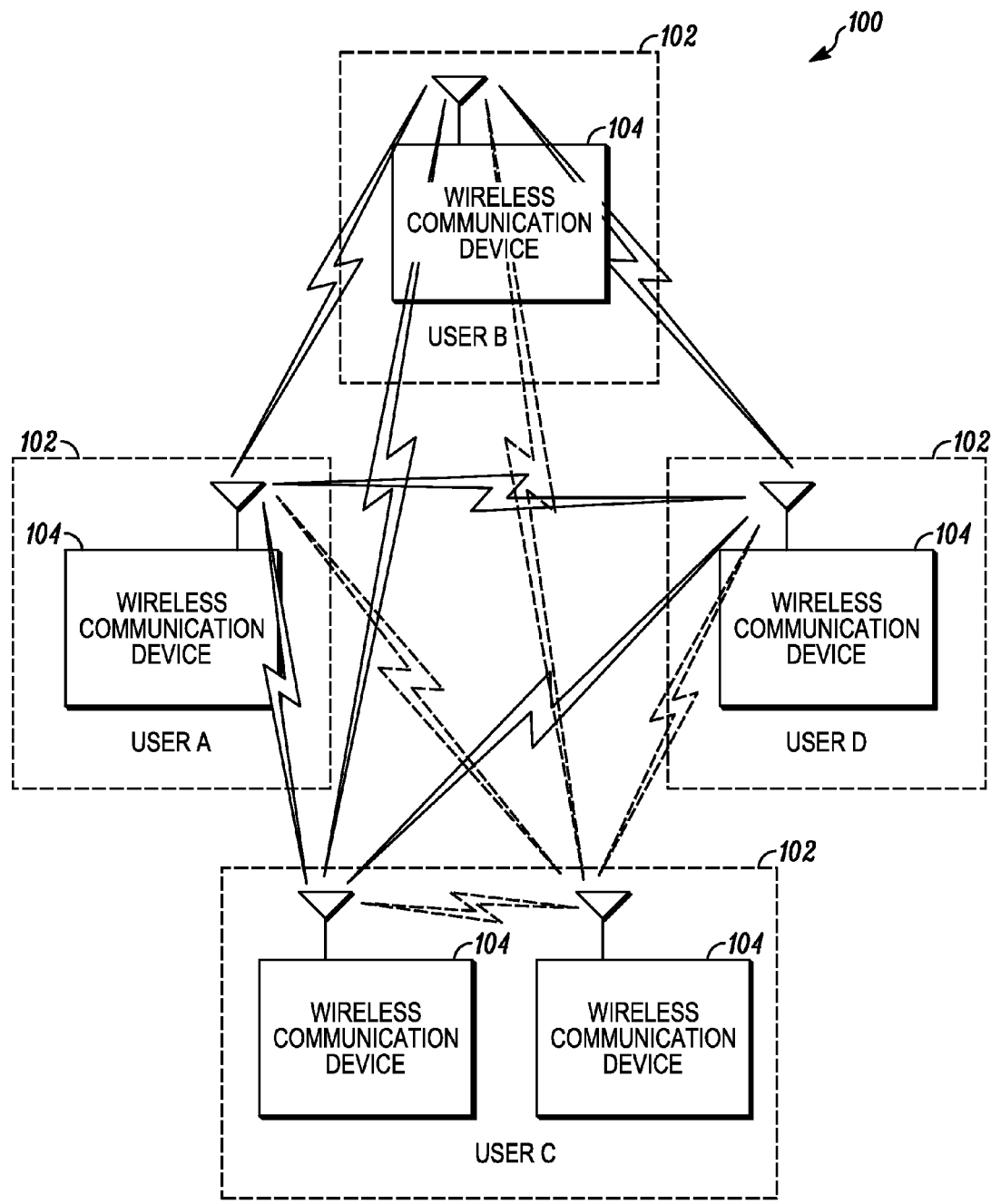
FIG. 1 is a block diagram of an exemplary ad-hoc network including multiple users and corresponding one or more wireless communication devices associated with each user.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram of an exemplary ad-hoc network 100 including multiple users 102 and corresponding one or more wireless communication devices 104 associated with each user. In the illustrated embodiment, the communication devices 104 are able to communicate wirelessly with the other communication devices 104. Users A, B and D are shown having one corresponding wireless communication device. User C is shown having a pair of associated wireless communication devices.

The wireless communication devices 104 can include any device adapted to communicate with another device. A couple of examples can include a radio frequency telephone, a tablet, a personal computer, a cellular telephone, a cordless telephone, a selective call receiver, an audio player, a gaming device, a set top box and a personal digital assistant. However one skilled in the art will appreciate that the present invention could also be used with many other types of devices, without departing from the teachings of the present invention, as increasingly more and more devices are being equipped with wireless communication capabilities for which the present application may be suitable including instances where it is desirable for the device to form and communicate within an ad-hoc network. At least a couple of examples of different types of ad hoc networks include a WI-FI Direct or a Bluetooth® type network. An ad hoc network has been identified as typically referring to any network where all of the devices can have relatively equal status, and where the devices are free to associate and more directly communicate with other ad hoc network devices within communication range.

Generally, the ad hoc network does not rely on a pre existing infrastructure, and as such data is conveyed in peer-to-peer fashion between various users without using an intermediate server. However, any particular communication may rely on multiple hops between its source and destination, such that a communication can be conveyed between two devices not directly linked.

Figure 2:
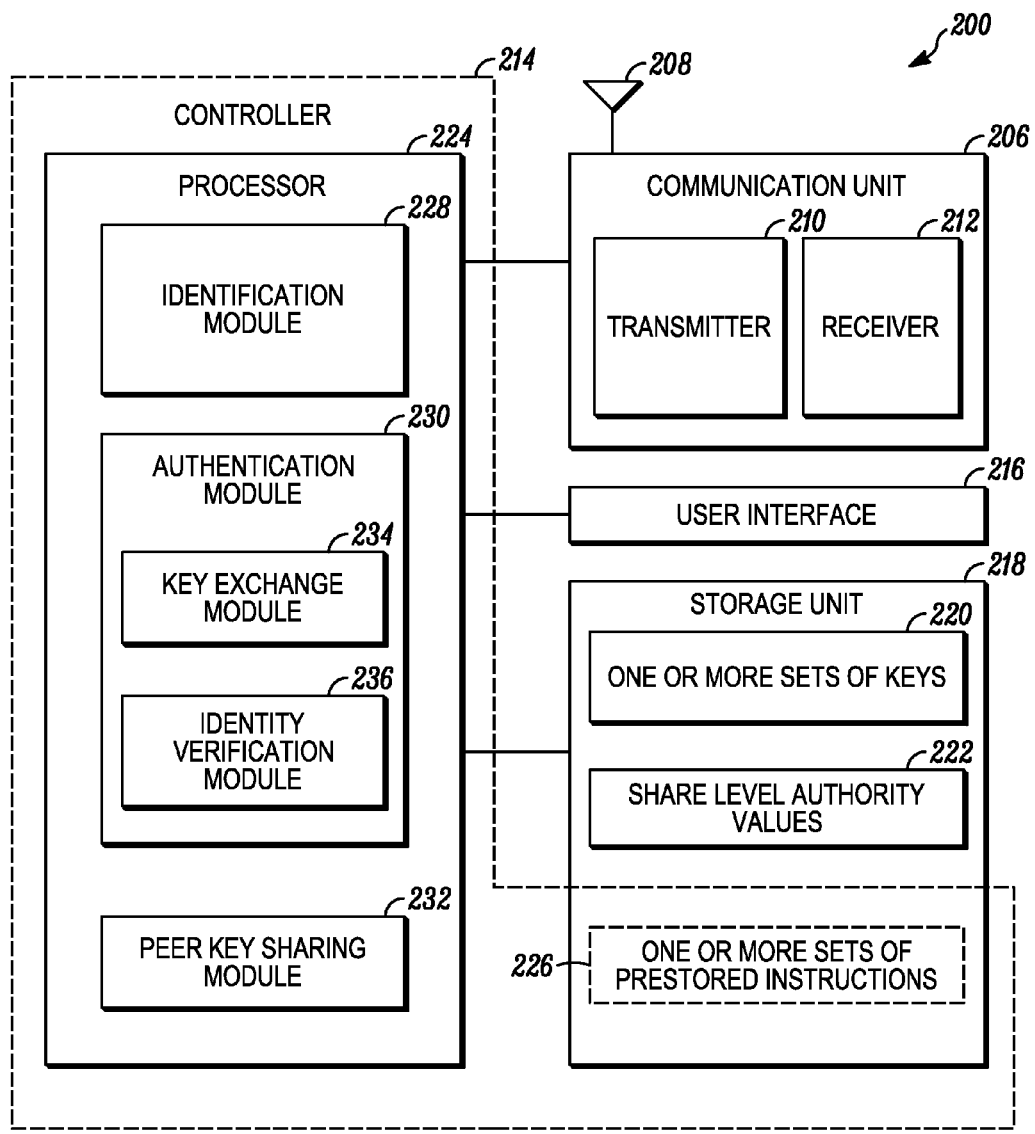
FIG. 2 is a block diagram of a wireless communication device for use in an ad-hoc network, illustrated in FIG. 1.

FIG. 2 illustrates a block diagram of a wireless communication device 200 for use in an ad-hoc network, illustrated in FIG. 1. More specifically, the wireless communication device 200 may correspond to one or more of the wireless communication devices 104, illustrated in FIG. 1.

The wireless communication device includes a communication unit 206 coupled to an antenna 208. In the illustrated embodiment, the communication unit 206 includes a transmitter 210 and a receiver 212. In at least some instances, the communication unit 206 might take the form of a transceiver, which supports both transmission and receipt of a wireless signal via the associated antenna 208. The communication unit 206 is coupled to a controller 214. In addition to a controller 214, the communication device 200 additionally includes a user interface 216 and a storage unit 218. The storage unit 218 is adapted for storing one or more sets of keys 220, as well as share level authority values 222. The controller 214 includes a processor 224, which includes a plurality of modules, which in connection with at least some embodiments, are in the form of one or more sets of prestored instructions 226, which are executed by one or more microprocessors. More specifically, the processor 224 includes an identification module 228, an authentication module 230, and a peer key sharing module 232. The authentication module 230 further includes a key exchange module 234 and an identity verification module 236.

The identification module 228 is adapted for identifying a plurality of users to be potentially included as part of an ad-hoc network. The authentication module 230 is adapted for authenticating the identified plurality of the users including exchanging public keys by the key exchange module 234 and verifying the identity of the plurality of users by the identity verification module 236. The peer key sharing module 232 determines whether a level of trust associated with a received share level authority enables the user of the communication device to provide peer key sharing of a public key relative to the respective one or more other user for providing key sharing with another user. If so, the device 200 shares the public key of the one or more other users with the device of another user.

In the same or other instances, the controller 214 may additionally or alternatively incorporate state machines and/or logic circuitry, which can be used to implement at least partially, some of modules and their corresponding functionality.

The storage unit 218 can include one or more forms of volatile and/or non-volatile memory, including conventional ROM, EPROM, RAM, or EEPROM. The storage unit 218 may still further incorporate one or more forms of auxiliary storage, which is either fixed or removable, such as a hard drive or a memory stick. One skilled in the art will still further appreciate, that still other further forms of memory could be used without departing from the teachings of the present invention including memory resources that might be made available from a remote or distributed source, such as the cloud.

Figure 3:
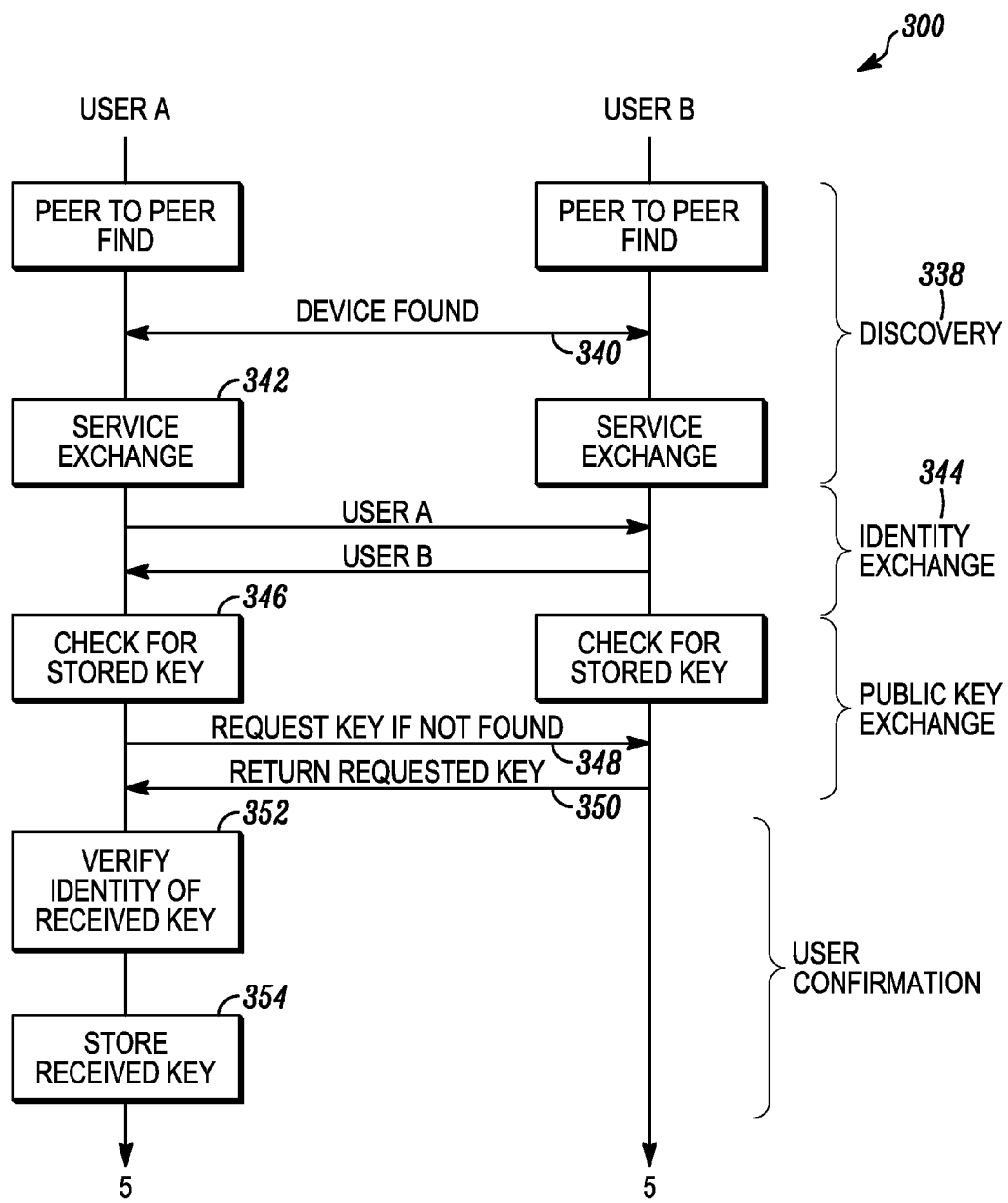
FIG. 3 is a first part of a message sequence diagram for establishing a communication connection in an ad-hoc network.

FIG. 3 illustrates a first part 300 of a message sequence diagram between two potential users 102 and their corresponding wireless communication devices 104 for establishing a communication connection in an ad-hoc network 100. Devices that intend to participate in a communication connection, such as an autonomous connection, need to first discover 338 each other. This may be accomplished by one of the devices sending out a probing signal, while the other device is listening. In order to reduce the required time for listening for a probing signal, it is possible for the devices to be time-synchronized, and that there be an understanding that any probing signal would occur within a particular time interval that the other devices are designated to be actively listening for such a signal. A time reference from a common server could be used to synchronize the time of the multiple devices, and correspondingly for identifying the period of time during which discovery signaling might take place.

If during the discovery window, a probing signal is detected from another device, then the wireless communication devices finding another peer 340 can follow up with further communications. For example, a follow up service exchange 342 might establish the type of signaling and/or parameters to be used in subsequent communications.

Generally, in response to finding another device, the devices will exchange identifying information 344 with user A identifying himself and user B identifying herself. Upon learning of the other device's identity, the respective device will look 346 to see if it already has a stored public key for the other user. If no corresponding key is found, then the device will request 348 a key for the other user. The other user will then return 350 with the requested key.

The device receiving the new key can then verify the identity of the received key in order to avoid the possibility that another device may have attempted to impersonate the other user by responding with their own key. The user of the device receiving the new key can verify 352 the integrity of the received key by comparing the received data in some way with the user from which he expected to receive the key. In at least one embodiment, the received key can be used to produce an identicon on each of the recipient device and the originating device, in order to provide a quick visually verifiable match.

Figure 4:
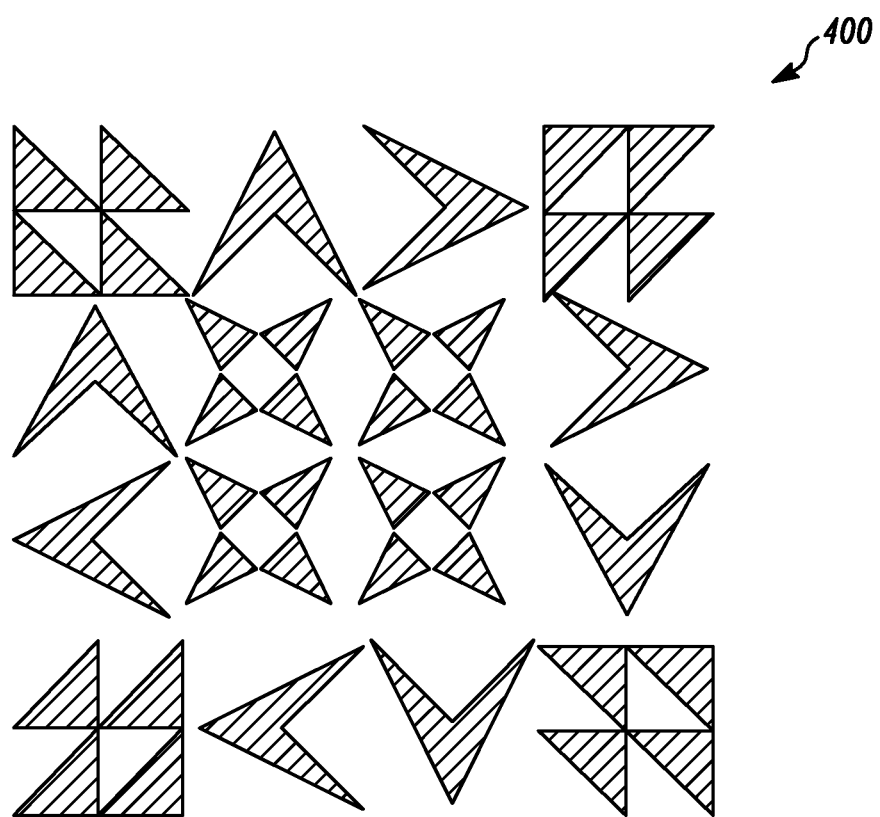
FIG. 4 is an example of an identicon.

An example of an identicon 400 is illustrated in FIG. 4. In the illustrated embodiment, the identicon is a 100 by 100 pixel image, that includes various repeating shapes at different orientations. While not reproduced in the illustrated example, the color of the produced image can also be used to convey additional information. Other examples of confirming information can include a determined sequence of audio notes derived from the key value sent and received, which is to be played and correspondingly compared between both the sender and the receiver of the key. In order for such a visual or audio verification to take place, it may be necessary for the users to be proximate to one another.

Figure 5:
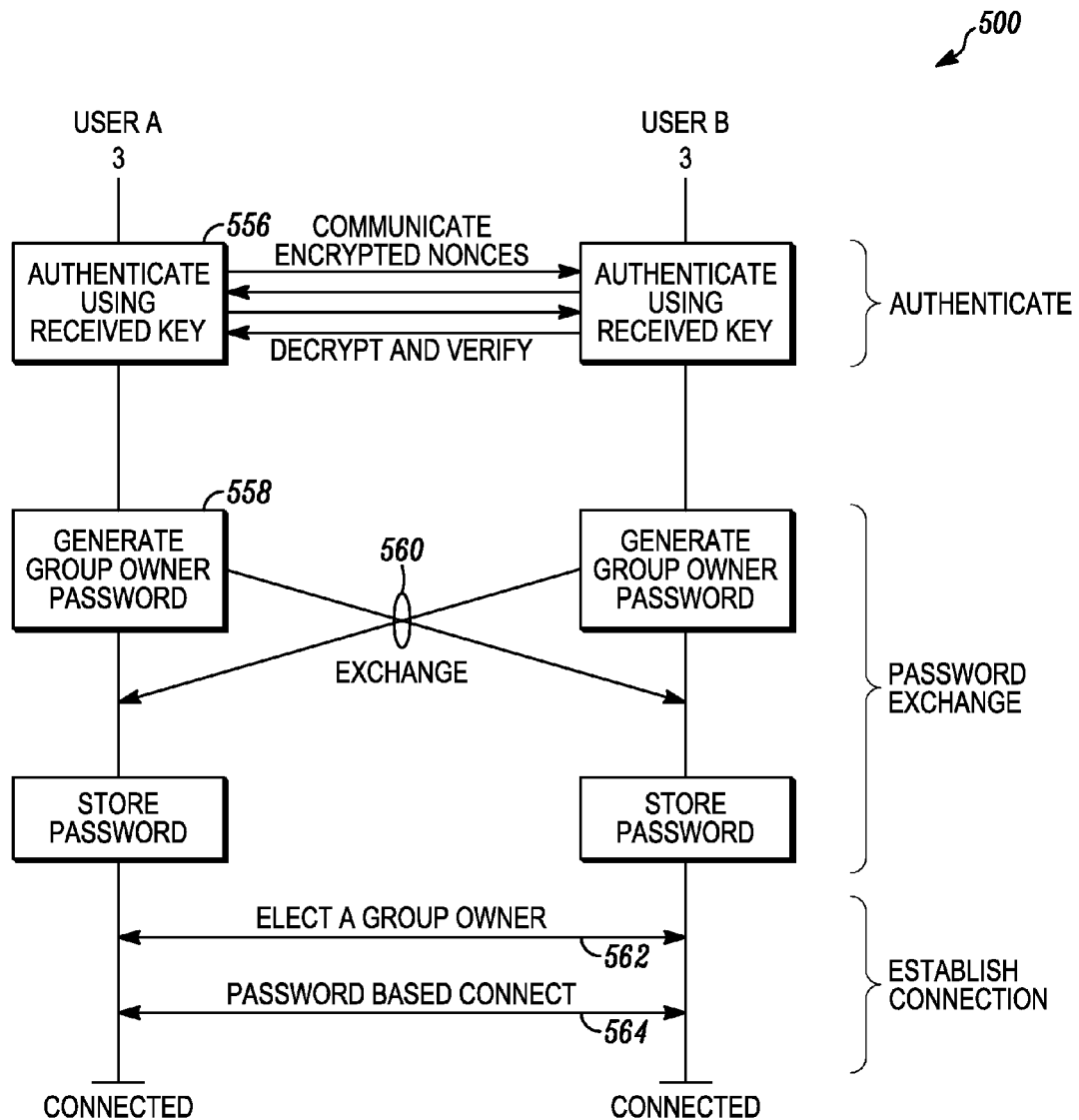
FIG. 5 is a second part of a message sequence diagram for establishing a communication connection in an ad-hoc network.

Upon verifying 352 the integrity of the received key, the device receiving the key can store 354 the same and associate it with the received identity of the newly discovered user. Once the devices that intend to connect have each other's keys (either through the exchange described above or through a previous exchange resulting in the storing of keys), they may proceed to authenticate 556 each other by issuing challenges with a random nonce. FIG. 5 illustrates a second part 500 of a message sequence diagram for establishing a communication connection in an ad-hoc network. For example, a random nonce can be encrypted by user A using user B's public key, which would enable the private key stored in user B's device to decrypt the nonce. User B could then respond with a further encryption of the decrypted nonce, using user A's public key, which when decrypted by user A using the private key of user A should result in a decrypted result that matches the original nonce. User B could similarly initiate a similar exchange, where if both sets of communications result in a respective matched nonce, then the authentication of the exchanged keys can be verified.

Upon successful authentication 556 of the other user, each user can generate 558 a group owner password, that can then be exchanged 560. Each group owner password can then be stored 562, and upon election of a group owner for the ad-hoc network, a password based connection can be made 564 using the appropriate group owner password. At this point the two devices are now part of a group post connection, which have a trust relationship. Such a group can include still further users.

Figure 6:
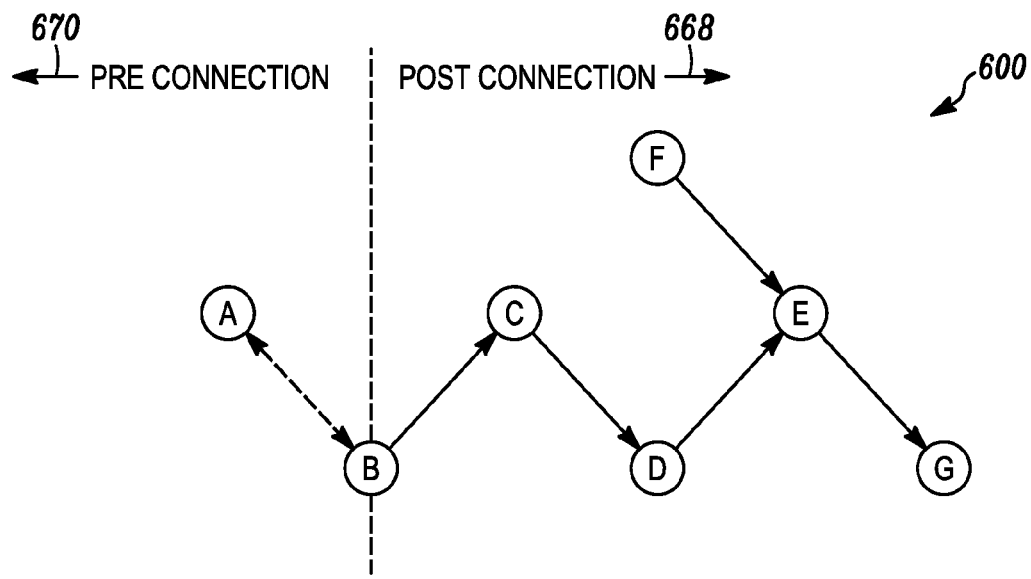
FIG. 6 is a node diagram for a plurality of nodes including a set of nodes post connection as part of an ad-hoc network, as well as at least one node pre-connection.

FIG. 6 illustrates a node diagram 600 for a plurality of nodes including a set of nodes post connection 668 as part of an ad-hoc network, as well as at least one node pre-connection 670. Post connection 668 indirect sharing of public keys may be more liberally made between members B-G, which presumably have a sufficient level of trust corresponding to their joint presence within a common group. Nevertheless there may be limits as to how many hops away a public key may be shared, that may be defined by one or more of the users. In order to share the keys, a communication can be made by an intervening user, whereby the relayed keys could be signed by the intervening user to track and preserve the source of the shared information.

After authenticating a mobile device in proximity via a trusted device, it may be desirable for a group owner to be able to share the profiles of the wireless ad hoc group members. In turn, this may make it easier to re-form a mobile ad hoc network, form a new mobile ad hoc group consisting of a subset of previous group members, or add new trusted mobile devices in proximity.

Figure 7:
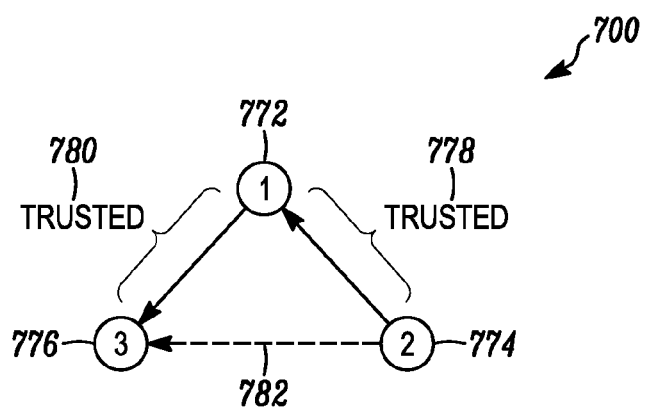
FIG. 7 is an exemplary node diagram illustrating peer public key sharing, where the value of the share authority level allows sharing between users having trust with the conveying user.

It is further possible for public keys to be shared pre-connection 670, in certain circumstances. It is envisioned that as part of the authentication process that the user, in addition to sharing their public key, might also convey a value corresponding to a configurable share authority level. The corresponding value might allow a first user 772 to share the public key of a second user 774 with a third user 776. For example, if the second user trusts 778 the first user and the first user trusts 780 the third user, then in at least some circumstances the first user may convey 782 the public key of the second user to the third user. FIG. 7 illustrates an exemplary node diagram 700 illustrating peer public key sharing, where the value of the share authority level allows sharing between users having trust with the conveying user.

Figure 8:
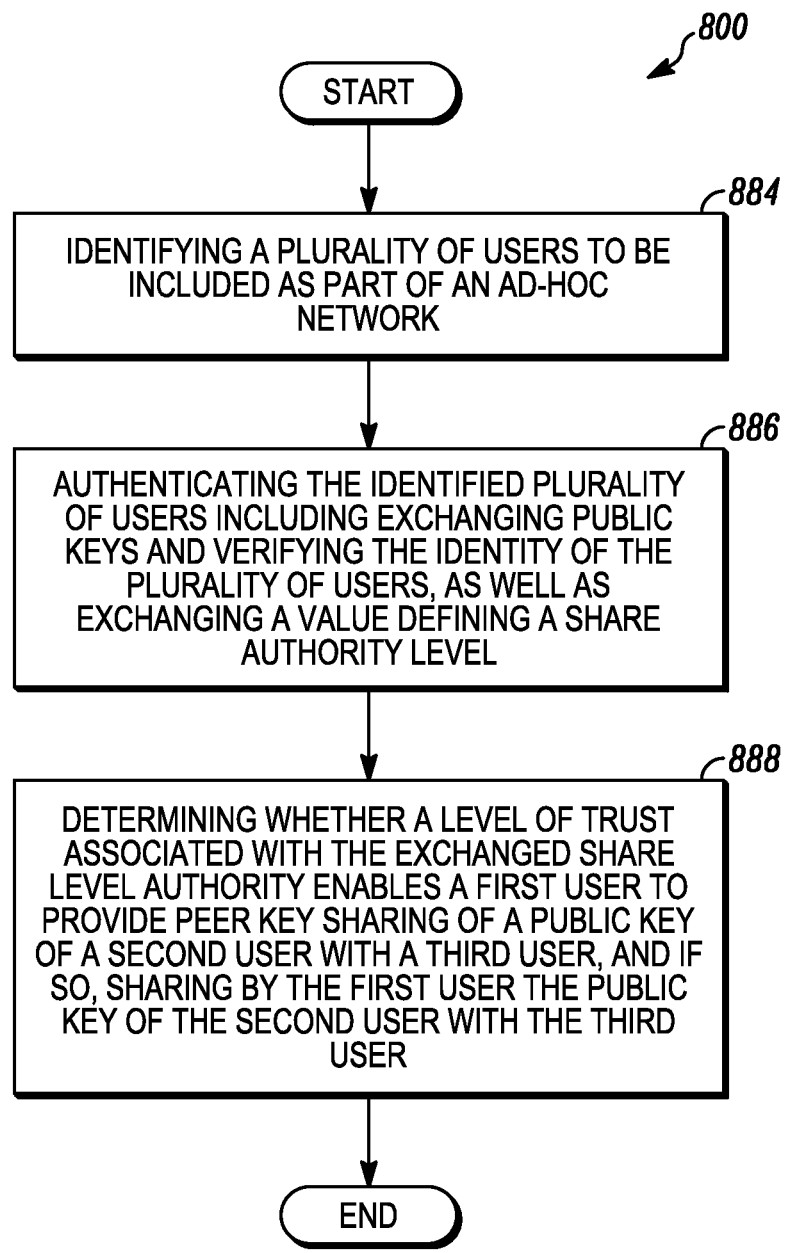
FIG. 8 is a flow diagram of a method for managing secure communications in an ad-hoc network.

FIG. 8 illustrates a flow diagram 800 of a method for managing secure communications in an ad-hoc network. The method includes identifying 884 a plurality of users to be included as part of an ad-hoc network, each user being associated with at least one communication device, and having a set of keys associated with the user for managing secure communications between the at least one communication device of the user and the at least one communication device of another one of the plurality of users.

By associating the set of keys with the user as opposed to a particular device of the user, then the user can avoid needing to separately manage the relationship of their devices relative to each of the groups. However in such an instance it will be beneficial for the user to use the same set of keys for each of their devices. The private key itself is typically stored in the secure storage area of each device. In at least some embodiments, provisions may be made which allow a user to extract the keys from one of their devices and provide the private keys to another one of their devices. In such an instance it may be beneficial for the exchange to require that the two devices be proximate to one another, and that the user confirm a secure storage password associated with the stored private key at the sender side.

The method illustrated in FIG. 8 further includes authenticating 886 the identified plurality of users including exchanging public keys and verifying the identity of the plurality of users, where authenticating further includes exchanging a value defining a share authority level. A determination 888 is then made as to whether a level of trust associated with the exchanged share level authority enables a first user to provide peer key sharing of a public key of a second user with a third user, and if so, sharing by the first user the public key of the second user with the third user.

Once an ad hoc group is established using the method and system disclosed herein, it may be further beneficial to use the group to distribute a notice of a social networking event, such as the birthday of one of its members, to members of the wireless ad hoc network that have established an element of trust. The nature of the ad hoc group and correspondingly the nature of the trust between group members can be used to determine which members are within the vicinity for which it might be more beneficial to be made aware of the corresponding social event. In this way, it may be possible to avoid the use of other forms of location identifying services, in order to determine the appropriate individuals to notify.

The fact that the present invention has been described relative to an ad hoc environment does not preclude the users from making use of a network infrastructure and/or cloud resources for supporting various functionality when they may be available. Furthermore, a time stamp could be associated with one or more shared keys which might be used to define an expiration period for use in revoking the corresponding previously provided keys.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A system for managing secure communications in an ad-hoc network, said system comprising:
   three or more communication devices associated with three or more users including a first user, a second user and a third user, each user being associated with at least one communication device, and having a set of keys associated with an associated user of at least one of the three or more communication devices for managing secure communications between the at least one of the three or more communication devices of the associated user and the at least one of the three or more communication devices of another one of the three or more users;
   wherein each set of keys includes a private key and a public key, where the public key is shared with the communication device of the other ones of the three or more users with which the user has been authenticated, and the private key is used to decrypt communications encrypted using the corresponding public key from the same set of keys; and
   wherein when the communication device of the second user of the three or more users has been authenticated by the communication device of the first user, in addition to receiving the associated public key of the second user, the communication device of the first user receives a value defining a share authority level, which defines the authority of the first user relative to the second user to provide peer key sharing of the public key of the communication device of the second user with the communication device of the third user.

2. A system in accordance with claim 1, wherein the associated communication devices of the three or more users are peer-to-peer communication devices.

3. A system in accordance with claim 1, wherein the ad-hoc network is an ad-hoc wireless communication network, and the associated communication devices of the three or more users are wireless communication devices.

4. A system in accordance with claim 1, wherein initially sharing a public key of a set of keys associated with a particular user as part of authenticating the particular user, the user of the communication device within which the public key of the particular user is being received is located proximate the particular user, in order for the user of the device within which the public key of the particular user is being received to visually verify the identity of the particular user.

5. A system in accordance with claim 4, wherein the user of the communication device within which the public key of the particular user is being received confirms visually an integrity of the received public key by comparing an identicon produced by the communication device within which the public key of the particular user is being received using the received public key with the identicon produced by the communication device of the particular user using the same public key.

6. A system in accordance with claim 1, wherein when a particular one of the three or more users has more than one associated communication device, each of the more than one communication devices associated with the particular user share the same set of keys.

7. A system in accordance with claim 6, wherein more than one communication devices associated with the particular user share the same private key via a secure direct communication, when the more than one communication devices associated with the particular user are proximate one another.

8. A system in accordance with claim 1, wherein peer key sharing of the public key of the second user by the first user with the third user includes a consideration of the value defining the share authority level relative to the second user, and a level of trust between the first user and the third user.

9. A system in accordance with claim 1, wherein the three or more communication devices are members of an ad-hoc group, and at least one of the three or more communication devices is a group owner for the ad-hoc group.

10. A system in accordance with claim 9, wherein the ad-hoc group is used to distribute a social networking event.

11. A method for managing secure communications in an ad-hoc network, said method comprising:
identifying a plurality of users to be included as part of an ad-hoc network, each user being associated with at least one communication device, and having a set of keys associated with the user for managing secure communications between the at least one communication device of the user and the at least one communication device of another one of the plurality of users;
authenticating the identified plurality of users including exchanging public keys and verifying the identity of the plurality of users, where authenticating further includes exchanging a value defining a share authority level; and
determining whether a level of trust associated with the exchanged share level authority enables a first user to provide peer key sharing of a public key of a second user with a third user, and if so, sharing by the first user the public key of the second user with the third user.

12. A method in accordance with claim 11, wherein identifying a plurality of user includes identifying the devices that are adapted to perform autonomous connections.

13. A method in accordance with claim 11, wherein when exchanging public keys, the users that are exchanging the public keys are located proximate to one another.

14. A method in accordance with claim 13, wherein when verifying the identity of the plurality of users after exchanging public keys, the user verifies an integrity of a received public key by comparing an identicon produced by the communication device using the received public key with the identicon produced by the communication device of the user associated with the received public key using the same public key.

15. A method in accordance with claim 11, wherein when one of the plurality of users has more than one communication devices, each of the more than one communication devices associated with the same user share the same set of keys.

16. A method in accordance with claim 15, wherein each of the more than one communication devices associated with the same user share the same set of keys when the more than one communication devices associated with the same user are proximate one another.

17. A method in accordance with claim 11, wherein when providing peer key sharing, the first user signs the public key of the second user, which is provided to the third user.

18. A method in accordance with claim 11, wherein one of the plurality of users included as part of the ad-hoc network is a group owner.

19. A method in accordance with claim 11, wherein the ad-hoc group is used to distribute a social networking event.

20. A communication device for use in an ad-hoc network providing secure communications, said device comprising:
a communication unit including a receiver, and a transmitter;
a memory for storing one or more sets of keys including a public and private key of the user of the device, public keys for each of the other users forming the ad-hoc network, and a share authority level for one or more of the other users forming the ad-hoc network, which define the authority of the user of the communication device relative to the respective one or more other users for providing peer key sharing with another user; and
a processor adapted for identifying a plurality of users to be included as part of the ad-hoc network, authenticating the identified plurality of users including exchanging public keys and verifying the identity of the plurality of users, and determining whether a level of trust associated with a received share level authority enables the user of the communication device to provide peer key sharing of a public key relative to the respective one or more other users for providing peer key sharing with another user, and if so, sharing by the user the public key of the one or more other users with another user.

* * * * *